Patented Dec. 19, 1922.

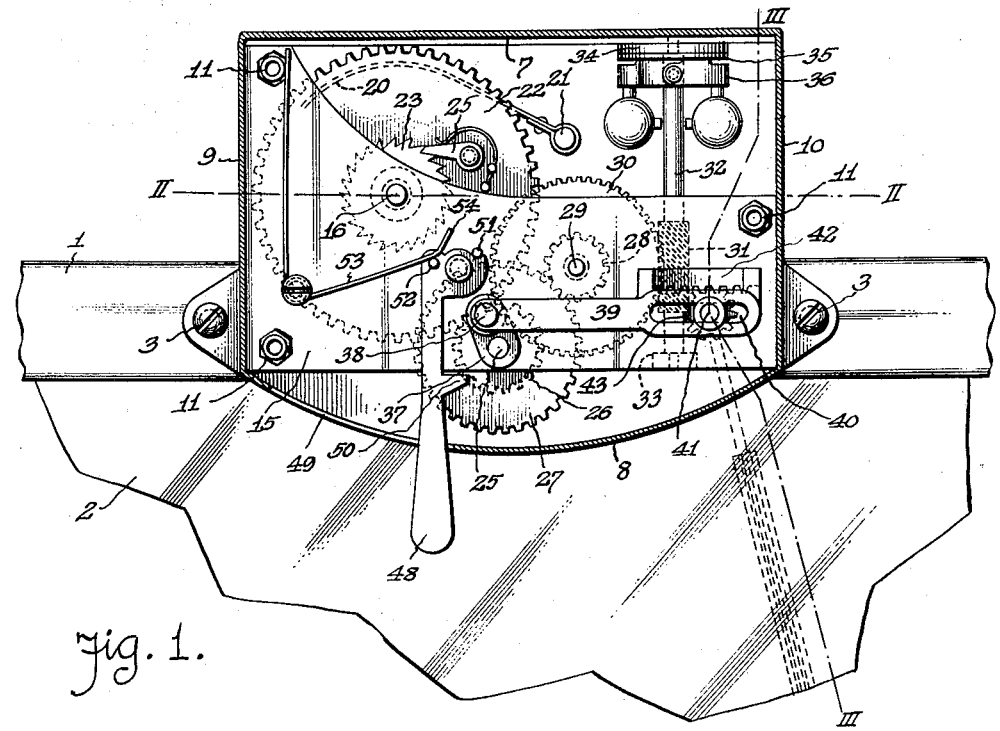

1,439,308

UNITED STATES PATENT OFFICE.

JOHN G. HALLER AND HERMAN C. NICHOLAUS, OF DETROIT, MICHIGAN.

WINDSHIELD CLEANER.

Application filed December 27, 1921. Serial No. 525,182.

*To all whom it may concern:*

Be it known that we, JOHN GEORGE HALLER and HERMAN C. NICHOLAUS, citizens of the United States of America, residing at Detroit, in the county of Wayne and State of Michigan, have invented certain new and useful Improvements in Windshield Cleaners, of which the following is a specification, reference being had therein to the accompanying drawings.

This invention relates to a windshield cleaning device and our invention aims to furnish the frame or supporting member of a windshield, window or the like with a device for automatically wiping a face of the shield or window, to scrape or otherwise remove snow, sleet, rain and other matter which might accumulate thereon and obscure vision. It is a well known fact that many accidents are attributed to the vision of a street car motor man or automobile operator being impaired by a befogged window or windshield, and if such window or windshield can be kept clean it is believed that such accidents will be materially reduced.

Our invention further aims to provide a windshield cleaning device wherein a spring actuated mechanism is employed for operating a wiper or scraper arm, the mechanism causing the wiper or scraping arm to oscillate and by its movement against a window or shield remove foreign matter therefrom cleaning a space through which observation may be made.

Our invention further aims to provide a simple, durable and compact mechanism which may be placed in an operative condition to actuate a wiping or cleaning arm at will, the mechanism including a stop for holding the mechanism normally in an operative condition, yet permitting of the mechanism being released to cause the wiping arm to oscillate.

The construction entering into our windshield cleaning device will be hereinafter specifically described and then claimed and reference will now be had to the drawing, wherein Figure 1 is a rear elevation of a portion of the windshield provided with a wiping device, which device is shown with the casing thereof in a longitudinal section and the mechanism in elevation;

Fig. 2 is a horizontal sectional view taken on the line II—II of Fig. 1, and

Fig. 3 is a cross sectional view taken on the line III—III of Fig. 1.

The reference numeral 1 denotes a windshield frame or support for a transparent shield 2, and suitably secured to the frame 1 by screw bolts 3 and nuts 4 or other fastening means is the back plate 5 of a casing, comprising a front wall 6 having integral top and bottom walls 7 and 8 respectively and end walls 9 and 10, said casing fitting on the edges of the back plate and cooperating therewith in providing an inclosure.

Riveted or otherwise connected to the back plate 5 are a plurality of posts 11 provided with nuts 12, spacing sleeves 13 and screws 14, the nuts 12 retaining a vertical longitudinally disposed partition 15 on the posts, and the screws 14 holding the casing relative to said post and the back plate.

Journaled in the back plate 5 and the partition 15 is a winding arbor 16 and the front wall 6 has an opening 17 in alinement with said winding arbor so that a key or winding device 18 may be mounted on the arbor to rotate the same. Attached to the winding arbor, as at 19, is the inner convolution of a coiled band spring 20, said spring having its outer convolution held by a post 21 protruding from the back plate 5.

Loose on the winding arbor 16 is a large gear wheel 22 and fixed on said winding arbor, adjacent said large gear wheel is a ratchet wheel 23 engaged by a spring pressed pawl 24 carried by the outer face of the large gear wheel 22. It is now apparent that the winding arbor 16 may be rotated to wind up or place under tension the spring 20 so that the expansive force of said spring may rotate the winding arbor 16 and through the medium of the ratchet wheel 23 and the pawl 24 rotate the large gear wheel 22.

Rotatably supported by the back plate 5 and the partition 15 is a crank shaft 25 having a small gear wheel 26 and a large gear wheel 27. The small gear wheel 26 meshes with the spring actuated gear wheel 22 and the large gear wheel 27 meshes with the small gear wheel 28 on a shaft 29 supported by the back plate 5 and the partition 15. Adjacent the small gear wheel 28 is a worm wheel 30 meshing with a worm 31 on a vertically disposed worm shaft 32 journaled in brackets 33 and 34 carried by the partition 15 and back plate 5. The bracket 34 has a wear plate 35 adapted to be engaged by governor arms 36 pivotally supported by the upper end of the worm shaft 32, said governor arms constituting a conventional form of governor which co-operates with the worm and worm wheel in preventing excessive speed of the spring motor, especially without work being performed thereby.

On the forward end of the crank shaft 25 is a crank 37 having a wrist pin 38 and loose on said wrist pin is the end of a pitman 39 which has its opposite end slotted, as at 40, so that it may be supported by a wiper shaft 41 journaled in the partition 15, the back plate 5 and the frame 1 of the shield 2. The slotted end of the pitman 39 has an offset rack 42 meshing with a pinion 43 on the wiper shaft 41, and it is now apparent that rotation of the shaft 25 will cause reciprocation of the pitman 39 and oscillation of the wiper shaft 41.

Adjustable on the forward end of the wiper shaft 41 is the hub portion 44 of a wiper arm 45 provided with a holder 46 for a wiper 47, said wiper bearing against the front face of the shield 2 to wipe, scrape or otherwise remove matter from the face of the shield to clear a space for observation purposes.

Pivotally mounted on the partition 15 is a stop lever or member 48 extending through a slot 49 provided therefor in the bottom wall 8 of the motor casing, and said stop lever has a lug 50 that may be placed in the path of the crank 37 or the wrist pin 38 to prevent counterclockwise rotation of the crank shaft 25. The pivoted end of the stop lever 48 is adapted to engage a stop pin 51 on the partition 15, said stop pin defining the position of the stop lever 48 to cause a cessation in the operation of the motor, and the pivoted end of said stop lever has a pin or projection 52 engaged by a spring 53, suitably supported by the partition 15. Pressure of the spring 53 against the pin 52 holds the stop lever 48 against the stop pin 51 of the partition, and said spring has an angular end 54 which when engaged by the pin 52 holds the stop lever 48 in a shifted position, with the lug 50 out of the path of rotation of the crank 37.

With the spring motor wound up it is only necessary for the operator of an automobile to shift the stop lever 48 to the left, considering Fig. 1, and then the motor is free to operate. When the crank shaft 25 is driven by the spring 20, the wiper will be oscillated or swung back and forth in an arc against the front face of the shield 2 and this operation will continue, either until the motor runs down or until the stop lever 48 is swung to the position shown in Fig. 1, when there will be a cessation in the operation of the motor and such energy stored in the spring may be utilized at another time for operating the wiper, whenever the shield 2 needs cleaning.

It is thought that the operation and utility of our device will be apparent without further description, and while in the drawing there is illustrated a preferred embodiment of our invention, it is to be understood that the structural elements are susceptible to such variations and modifications as fall within the scope of the appended claims.

What we claim is:

1. In a windshield wiping device, the combination of an oscillatory shaft adapted to support an arm; means adapted to oscillate said shaft, said means including a pinion on said shaft, a rack engaging said pinion, a crank shaft adapted to reciprocate said rack, means adapted to have energy stored therein to rotate said crank shaft, and means adapted to be shifted into and out of the path of the crank of said crank shaft to control the operation of said crank shaft.

2. Means for operating an arm, as in claim 1, wherein the last mentioned means includes a spring engaged lever with the spring disposed to hold the lever in either position to which it may be adjusted.

In testimony whereof we affix our signatures in presence of two witnesses.

JOHN G. HALLER.
HERMAN C. NICHOLAUS.

Witnesses:
ANNA M. DORR,
KARL H. BUTLER.